United States Patent
Chu

(10) Patent No.: US 7,746,744 B2
(45) Date of Patent: Jun. 29, 2010

(54) OPTICAL RECORDING SYSTEM AND METHOD THEREOF

(75) Inventor: Szu-Lien Chu, Taipei (TW)

(73) Assignee: Via Technologies, Inc., Taipei (TW)

( * ) Notice: Subject to any disclaimer, the term of this patent is extended or adjusted under 35 U.S.C. 154(b) by 921 days.

(21) Appl. No.: 11/324,361

(22) Filed: Jan. 3, 2006

(65) Prior Publication Data

US 2007/0064555 A1 Mar. 22, 2007

(30) Foreign Application Priority Data

Sep. 20, 2005 (TW) .............................. 94132481 A

(51) Int. Cl.
*G11B 7/00* (2006.01)
(52) U.S. Cl. .................. 369/53.18; 369/44.33
(58) Field of Classification Search .............. 369/44.33, 369/53.12, 53.13, 53.18, 53.42
See application file for complete search history.

(56) References Cited

U.S. PATENT DOCUMENTS

| | | | | |
|---|---|---|---|---|
| 5,282,184 | A * | 1/1994 | Takikita | 369/44.25 |
| 6,801,482 | B1 * | 10/2004 | Iijima et al. | 369/44.11 |
| 2001/0028614 | A1 * | 10/2001 | Furukawa | 369/44.32 |
| 2004/0066716 | A1 * | 4/2004 | Yu | 369/44.29 |
| 2005/0265199 | A1 * | 12/2005 | Nakano et al. | 369/59.22 |
| 2005/0270942 | A1 * | 12/2005 | King et al. | 369/53.15 |

* cited by examiner

*Primary Examiner*—Peter Vincent Agustin
*Assistant Examiner*—Emily Frank
(74) *Attorney, Agent, or Firm*—Thomas, Kayden, Horstemeyer & Risley

(57) ABSTRACT

An optical recording system and a control method thereof. The method includes detecting a target signal level. If the change level of the target signal exceeds a tolerant range, it represents that a shock has occurred. The shock frequency is recorded according to the shock, and the tolerant range is adjusted according to the recorded shock frequency. If the change level of the target signal exceeds the tolerant range, a pick-up head stops writing data into the optical storage medium. If the change level of the target signal is less than or equal to the tolerant range, the pick-up head writes data into the optical storage medium.

18 Claims, 2 Drawing Sheets

OPTICAL RECORDING SYSTEM AND METHOD THEREOF

BACKGROUND OF THE INVENTION

Field of the Invention

The invention relates to an optical recording system and a method thereof, and more particularly to an optical recording system and method by detecting signal level change.

In recent years, the development of new optical recording media and data compression techniques have made it possible to achieve enormous data storage capacity using optical storage systems. Optical drives, such as Compact Disk (CD) players and the more recent Digital Video Disk (DVD) players, are used to access audio data as well as visual and computer information stored on optical media discs.

An optical sensor in the recorder detects the relative positions of a pick-up head and an optical storage medium. When the relative positions of the pick-up head and the optical storage medium change, which indicates that the optical recorder has been waved or shocked, a track error signal (TE) or a focus error signal (FE) is generated in response. Generally, the track error signal is caused by horizontal waves, and the focus error signal is caused by vertical waves. To prevent recording on adjacent track(s), the optical recorder stops recording while optical recorder is vibrated. If the recording data is an audio/video data, such as a television program, to stop recording would cause data broken, and affect the performance when reproduce the audio or video data.

BRIEF SUMMARY OF THE INVENTION

A detailed description is given in the following embodiments with reference to the accompanying drawings.

Accordingly, the invention provides a method and system for dynamically controlling the recording process. The optical recording system of the invention comprises a shock detector, a frequency recorder, a tolerant range controller and an optical pick-up head. The shock detector detects a target signal, and determines a shock occurring when the change level of the target signal exceeds a tolerant limit. The frequency recorder records the shock frequency. The tolerant range controller adjusts the tolerant range according to the shock frequency. The optical pick-up head writes data into an optical storage medium when the change level of the target signal exceeds the tolerant range, and stops writing data when the change level of the target signal is less than the tolerant range.

The invention further provides a method for controlling an optical recording system. The method comprises detecting change level of a target signal, and determines that a shock occurring when the change level of the target level exceeds a tolerant range. The shock frequency is recorded, and the tolerant range is adjusted according to the shock frequency. A pick-up head is then determined whether to write data into an optical storage medium or not according to the adjusted-tolerance range. If the change level of the target signal is less than the adjusted-tolerance range, the optical pick-up head writes the data into the optical storage medium. Otherwise, the optical pick-up head stops writing the data into the optical storage medium.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
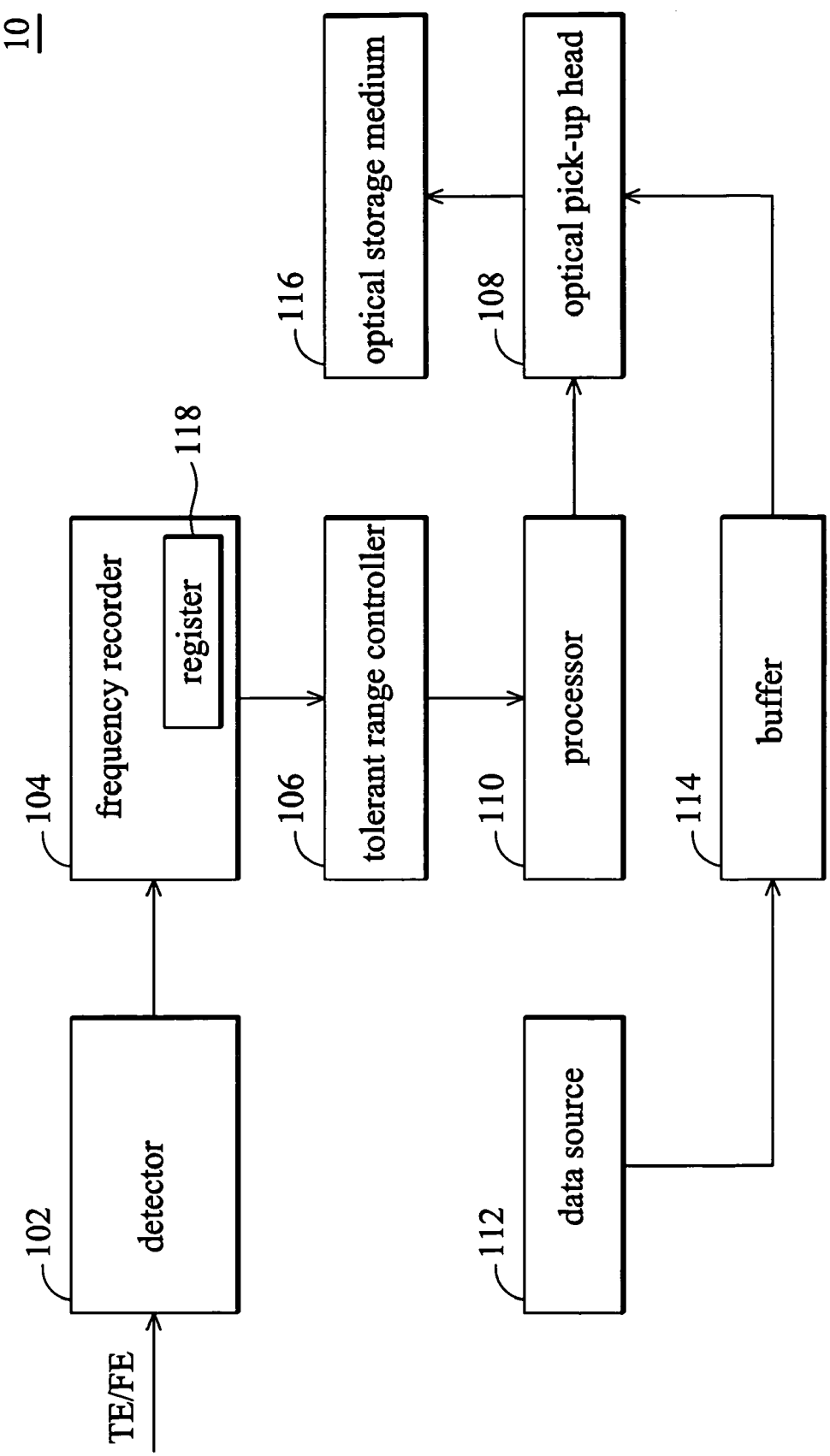
FIG. 1 shows a block diagram of an optical recording system according to an embodiment of the invention.

FIG. 1 shows a block diagram of an optical recording system according to an embodiment of the invention. The system comprises a shock detector 102, a frequency recorder 104, a tolerant range controller 106, an optical pick-up head 108 and a processor 110. The shock detector 102 detects the change level of a target signal. If the change level of the target signal exceeds a tolerant range, it is shown that a shock occurs. The target signal may be a track error signal (TE) or a focus error signal (FE). The frequency recorder 104 records the shock frequency of the track error signal or the focus error signal. The frequency recorder may comprise a timer and a counter, thus the frequency recorder can count how many shocks occur within a predetermined period. The tolerant range controller 106 adjusts the tolerant value according to the shock frequency of the target signal. In this embodiment of the invention, the predetermined period is 4 seconds. The period, however, can vary under different operating conditions. If the shocks of the target signal occur over once within the predetermined period, the tolerant range enlarges, for example, from ±0.1 volts to ±0.3 volts in order. Conversely, if the shock of the target signal occurs less than twice, the tolerant controller adjusts the tolerant range from ±0.3 volts (the maximum tolerant value) to ±0.1 volts (the minimum tolerant value). The optical pick-up head 108 writes data into an optical storage medium 116 from a data source 112. The data source 112 may be a video or audio source, such as MPEG or AVI files. The data from the data source 112 is temporarily stored in a buffer 114, and the optical pick-up head then reads the data from the buffer 114 and writes the data into the optical storage medium 116. The processor 110 determines whether or not the optical pick-up head 108 writes the data into the optical storage medium 116. When the change level of the target signal is less than the tolerant range, the optical pick-up head 108 writes the data into the optical storage medium 116. Otherwise, the optical pick-up head 108 stops writing the data into the optical storage medium 116.

In another embodiment of the invention, the frequency recorder 104 further comprises a register 118. The register 118 stores a sequence of tolerant range from ±0.3 volts to ±0.1 volts. If the shocks occur over once in the per-determined period, the tolerant controller 106 updates the current-tolerance range according to the sequence of tolerant range until the tolerant value is the maximum tolerant value. For example, in an embodiment of the invention, the sequence of the tolerant range may be ±0.1, ±0.15, ±0.2, ±0.25, and ±0.3 volts. In other embodiments of the invention, the tolerant range may be modified according to different operating systems. When the shocks of the target signal occur over once in the per-determined period, the tolerant range controller 106 enlarges the tolerant range in order according to the sequence of the tolerant range stored in the register 118. When a shock occurs less than twice, the tolerant range controller 106 reduces the tolerant range in order according to the sequence of the tolerant range. If the shocks of the target signal occur over once and the current tolerant value is the maximum value of the sequence of tolerant range, in this case, ±0.3 volts, the tolerant range controller keeps the current tolerant range (±0.3 volts) constantly. Conversely, if the shock of the target signal occurs less than twice and the current tolerant value is the minimum value of the sequence of tolerant range, in this case, ±0.1 volts, the tolerant range controller keeps the current tolerance value (±0.1 volts) constantly.

For example, if the current tolerant range is ±0.1 volts, when a shock occurs over once within 4 seconds, the tolerant range is adjusted from ±0.1 volts to ±0.15 volts. When the shock occurs over once within succeeding 4 seconds, the tolerant range is adjusted from ±0.15 to ±0.20 volts, and so on. It is shown that the tolerant range adds in order with the shock occurring in 4 seconds until the tolerant range approaches to the maximum tolerant value such as ±0.3 volts in this embodiment. When the shocks occur over once within another 4 seconds and the current tolerance value is ±0.3 volts, which is the maximum value of the sequence of the tolerant range, the current-tolerance value keeps constantly. On the other hands, when the current-tolerance value is ±0.1 volts and the shock occurs less than twice in 4 seconds, the tolerant value maintains ±0.1 volts.

Figure 2:
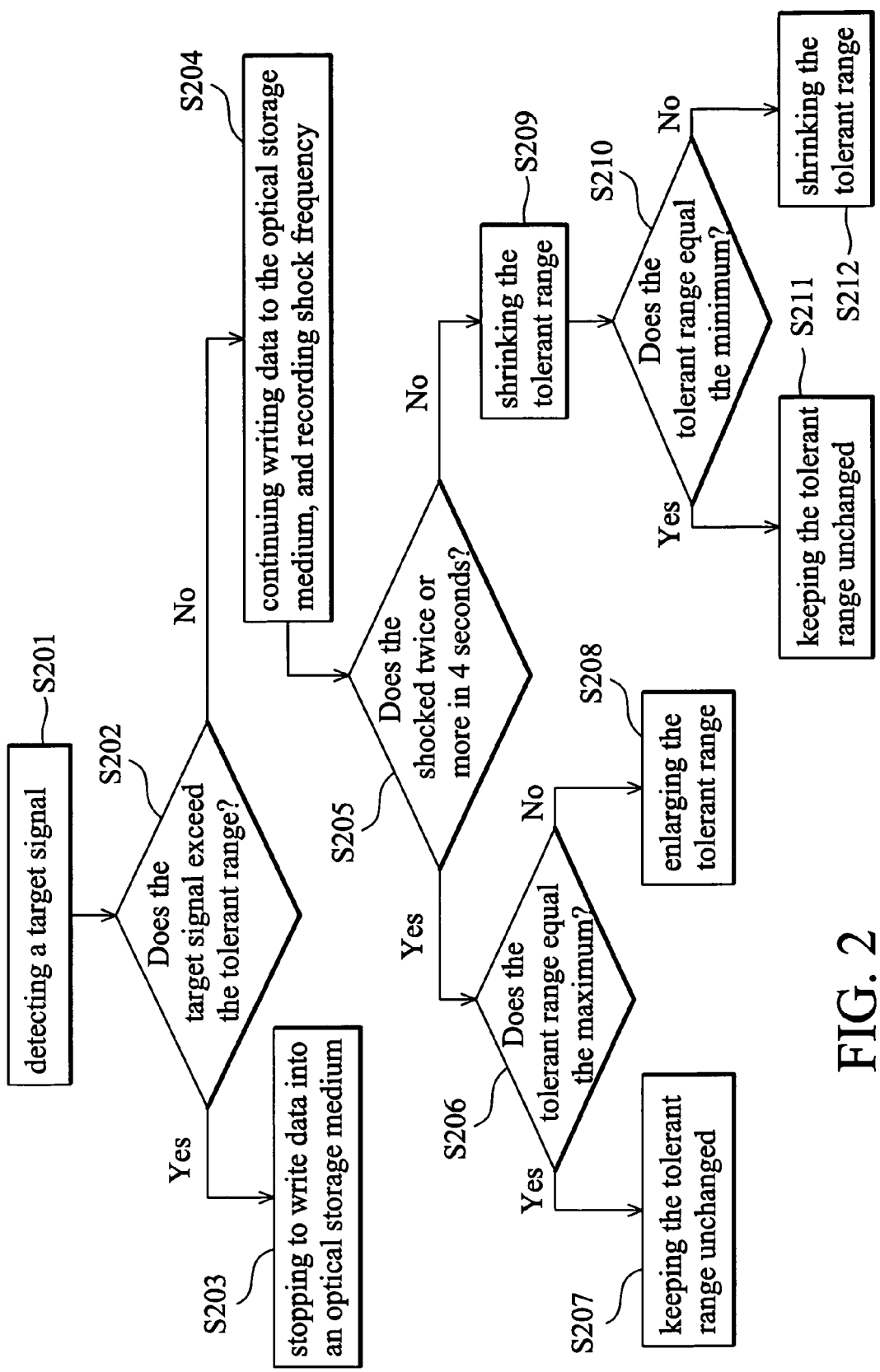
FIG. 2 shows a method of controlling an optical pick-up head according to an embodiment of the invention.

FIG. 2 shows a method of controlling an optical pick-up head according to an embodiment of the invention. In step 201, a target signal is detected, where the target signal may be a focus error signal or track error signal. A shock is defined as a change level of the target signal exceeding a tolerant range in step 202. If the target signal exceeds the tolerant range, the optical pick-up head 108 stops to write data into an optical storage medium 116 in step 203. If the change level of the target signal falls in the tolerant range, the optical pick-up head 108 continues writing data into the optical storage medium 116, where the data may be video data, audio data, or the combination thereof, such as MPEG and AVI files. The data may be stored in a buffer 114 temporarily, and the optical pick-up head 108 then reads the data form the buffer 114 and writes the data to the optical pick-up head 108. Every shock is recorded by a frequency recorder 104, in step 204. The frequency recorder 104 records the shock times in a per-determined period, for example, 4 seconds. If the shocks of the target signal occur over once in the per-determined period, the tolerant range controller updates the current tolerant value in order according to a sequence of tolerant range. In this embodiment of the invention, the sequence of the tolerant range may be ±0.1, ±0.15, ±0.2, ±0.25, and ±0.3 volts. In step 205, when the shocks occur over once in the per-determined period, the tolerant value is updated in order according to the sequence of the tolerant range. In step 209 and 212, when the shock occurs less than twice, the tolerant range is reduced in order according to the sequence of the tolerant range. In step 208, when the shocks occur over once and the current-tolerance value is the maximum value of the sequence of the tolerant range, the current-tolerance range keeps constantly. In step 210 and 211, when the shock occurs less than twice and the current-tolerance value is the minimum value of the sequence of the tolerant value, the current tolerant value keeps constantly.

In other embodiment of the invention, the sequence of the tolerant range is from ±0.1 to ±0.3 volts. When the shocks of the target signal occur over once in the per-determined period, the tolerant range is adjusted from ±0.1 to ±0.3 volts. When the shocks of the target signal occur less than twice in the predetermined period, the tolerant range is reduced from ±0.3 to ±0.1 volts.

In the invention, the recording requirement can be adjusted dynamically. If a series of slight shocks occurs frequently, the system can continue recording for preventing unnecessary pauses caused by the slight shocks. This is, particularly, useful when recording television programs. The proposed method and system can prevent unnecessary pauses, thus, avoiding lose data. When the series of shocks end, the method and system provided in the invention can automatically adjust the tolerant range in order. Hence, the system can record data with higher quality when the shocks end.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical recording system, comprising:
    a shock detector detecting a target signal level and detecting a shock when the target signal level exceeds a tolerant range;
    a frequency recorder recording a shock frequency according to the shock;
    a tolerant range controller adjusting the tolerant range according to the shock frequency, wherein the frequency recorder comprises a timer and counter for recording the number of shocks within a predetermined period and a register for recording a sequence of tolerant range for a plurality of tolerant ranges, and when the target level is shocked over once in the predetermined period, the tolerant controller automatically updates the tolerant range to another tolerant range according to the sequence of tolerant range; and
    an optical pick-up head, when the target signal level exceeds the maximum of the sequence of the tolerant range, the pick-up head stops writing data into an optical storage medium, and when the target signal level is less than the maximum of the sequence of the tolerant range, the pick-up head writes the data into the optical storage medium.

2. The optical recording system as claimed in claim 1, wherein when the frequency recorded in the frequency recorder is over once, the tolerant controller enlarges the tolerant range according to the sequence of tolerant range.

3. The optical recording system as claimed in claim 2, wherein when the frequency recorded in the frequency recorder is more than once, and the tolerant range is the maximum of the sequence of tolerant range, the tolerant controller keeps the tolerant range unchanged.

4. The optical recording system as claimed in claim 1, wherein when the frequency recorded in the frequency recorder is less than twice, the tolerant controller reduces the tolerant range according to the sequence of tolerant range.

5. The optical recording system as claimed in claim 4, wherein when the frequency recorded in the frequency recorder is less than twice, and the tolerant range equals the minimum of the sequence of the tolerant range, the tolerant controller keeps the tolerant range unchanged.

6. The optical recording system as claimed in claim 1, further comprising a processor, wherein the data is a video/audio source, and the processor provides the data to the optical pick-up head through a buffer.

7. A method for recording in an optical recording system, comprising:
- detecting an amount of change level in a target signal, and defining a shock when the amount of change in the target level exceeds a tolerant range;
- recording a shock frequency according to the shock;
- adjusting the tolerant range according to the shock frequency, wherein the step of recording the shock frequency is performed by recording the times of shock within a predetermined period and the method further comprising recording a sequence of tolerant range for a plurality of tolerant ranges, and when the target signal is shocked over once in the predetermined period, the tolerant range controller automatically updates the tolerant range to another tolerant range according to the sequence of tolerant range; and
- determining whether a pick-up head to write data into an optical storage medium according to the tolerant range and the change level of the target signal; when the change level of the target signal exceeds the maximum of the sequence of the tolerant range, the pick-up head stops writing data into the optical recording medium, and when the change level of the target signal is less than the maximum of the sequence of the tolerant range, the optical pick-up head writes the data into the optical storage medium.

8. The method as claimed in claim 7, further comprising enlarging the tolerant range according to the sequence of tolerant range, and updating the tolerant range when the target signal is shocked over once in the predetermined period.

9. The method as claimed in claim 8, further comprising leaving the tolerant range unchanged when the target signal is shocked over once and the tolerant range is the maximum of the sequence of the tolerant range.

10. The method as claimed in claim 7, further comprising reducing the tolerant range when the target signal is shocked less than twice according to the sequence of the tolerant range.

11. The method as claimed in claim 7, further comprising leaving the tolerant range unchanged when the target signal is shocked less than twice and the tolerant range is the minimum among the sequence of the tolerant range.

12. The method as claimed in claim 7, wherein the data is written into the optical storage medium by the optical pick-up head through a buffer.

13. An optical recording system, comprising:
- a shock detector detecting a signal level of a focus error signal or a track error signal and detecting a shock when the signal level exceeds a current tolerant range;
- a frequency recorder recording a shock frequency according to the shock and a sequence of tolerant range;
- a tolerant range controller adjusting the current tolerant range to one of a plurality of predetermined tolerant ranges according to the shock frequency; and
- an optical pick-up head, when the signal level exceeds the maximum of the predetermined tolerant ranges, the pick-up head stops writing data into an optical storage medium, and when the signal level is less than the maximum of the predetermined tolerant ranges, the pick-up head writes the data into the optical storage medium.

14. The optical recording system as claimed in claim 13, wherein the frequency recorder comprises a timer and counter for recording the number of shocks within a predetermined period and a register for recording the plurality of predetermined tolerant ranges.

15. The optical recording system as claimed in claim 14, wherein when the frequency recorded in the frequency recorder is over once, the tolerant controller adjusts the current tolerant range to a larger one of the plurality of predetermined tolerant ranges.

16. The optical recording system as claimed in claim 15, wherein when the frequency recorded in the frequency recorder is more than once and the current tolerant range is the maximum of the plurality of the predetermined tolerant ranges, the tolerant controller keeps the current tolerant range unchanged.

17. The optical recording system as claimed in claim 14, wherein when the frequency recorded in the frequency recorder is less than twice, the tolerant controller adjusts the current tolerant range to a smaller one of the plurality of predetermined tolerant ranges.

18. The optical recording system as claimed in claim 17, wherein when the frequency recorded in the frequency recorder is less than twice and the current tolerant range equals the minimum of the plurality of predetermined tolerant ranges, the tolerant controller keeps the current tolerant range unchanged.

* * * * *